United States Patent [19]
Furuta et al.

[11] Patent Number: 5,410,528
[45] Date of Patent: Apr. 25, 1995

[54] SERVO TRACKING CIRCUIT OF AN OPTICALLY WRITABLE/READABLE/ERASABLE DISK

[75] Inventors: Satoshi Furuta, Kato; Shigenori Yanagi, Kawasaki, both of Japan

[73] Assignee: Fujitsu Limited, Kawasaki, Japan

[21] Appl. No.: 17,391

[22] Filed: Feb. 12, 1993

[30] Foreign Application Priority Data

Feb. 14, 1992 [JP] Japan ................................ 4-028055

[51] Int. Cl.[6] .......................... G11B 5/09; G11B 5/76
[52] U.S. Cl. .......................................... 369/59; 360/51
[58] Field of Search ...................... 360/40, 46, 48, 51, 360/53; 369/44.25, 44.29, 44.32, 44.35, 53, 54, 59, 111, 116, 124

[56] References Cited

U.S. PATENT DOCUMENTS

| | | | |
|---|---|---|---|
| 3,938,184 | 2/1976 | DeFrancesco et al. | 360/51 |
| 4,611,319 | 9/1986 | Naito | 369/59 X |
| 4,764,824 | 8/1988 | Tani et al. | 360/70 |
| 4,789,975 | 12/1988 | Taniyama | 369/59 X |
| 4,825,307 | 4/1989 | Otokawa et al. | 360/60 X |
| 4,855,978 | 8/1989 | Kanamaru | 360/78.04 |
| 4,866,691 | 9/1989 | Yokogawa | 369/59 X |
| 4,982,392 | 1/1991 | Soejima | 369/44.25 |
| 5,062,009 | 10/1991 | Yamagata et al. | 360/66 X |
| 5,146,440 | 9/1992 | Yamaguchi et al. | 369/32 |
| 5,191,566 | 3/1993 | Yamaguchi et al. | 360/78.06 X |
| 5,214,545 | 5/1993 | Maeda | 360/66 X |
| 5,231,618 | 7/1993 | Tabata et al. | 369/44.29 |

OTHER PUBLICATIONS

Patent Abstracts of Japan, vol. 7, No. 238 (P-231), Oct. 22, 1983 & JP-A-58 125241 (Matsushita Denki Sangyo KK), Jul. 26, 1983.
Patent Abstracts of Japan, vol. 14, No. 253 (P-1054), May 30, 1990 & JP-A-02 066743 (Fujitsu Ltd), Mar. 6, 1990.

Primary Examiner—Donald Hajec
Assistant Examiner—Thien Minh Le
Attorney, Agent, or Firm—Staas & Halsey

[57] ABSTRACT

An optical disk apparatus which is servo-controlled to trace a track according to a servo signal wherein the track is optically and selectively writable, readable and erasable according, respectively, to write, read and erase pulses of light emitted into the track. The optical disk apparatus includes a pulse edge detection mechanism which outputs an edge detection signal upon detecting an edge of a writing pulse or an edge of an erasing pulse, a masking pulse forming mechanism which generates, in response to the edge detection signal, a masking pulse used for disabling the servo signal during the masking pulse so as to prevent an erroneous servo signal caused from a switching transient of the writing pulse or the erasing pulse, and a pulse duration setting mechanism, receiving clock pulses as an input, for setting a pulse duration of the masking pulse by counting the clock pulses. The pulse duration setting mechanism includes a counter to count the clock pulses wherein a count number of the counter is presettable.

9 Claims, 5 Drawing Sheets

SERVO TRACKING CIRCUIT OF AN OPTICALLY WRITABLE/READABLE/ERASABLE DISK

BACKGROUND OF THE INVENTION

1. Field of the invention

This invention relates to a servo tracking circuit used in an optically writable/readable/erasable disk apparatus.

2. Description of the Related Arts

An optically or magneto-optically writable/readable/erasable disk (referred to hereinafter as optical disk) apparatus has been popularly employed as a medium to record large amounts of digital data. A light emitted from a light source, typically a laser diode, must be focused onto a track of as fine as several micro meter spacing. In order for the light to trace the track, a tracking servo and a focusing servo are employed and a tracking error signal and focusing error signal obtained from a light reflected from the track is negatively fed back so as to become minimum.

On the other hand, level and duration of the light is modulated so as to be adequate to write, read or erase respectively the data on the disk. The light level to write or to erase the data is considerably larger than the level to read the data, therefore, by largely changing the light emission level, the oscillation mode of the laser diode changes. In addition, the modulation current applied to the laser diode changes abruptly and drastically. Furthermore, undesirable noise pulses are formed in the tracking/focusing error signals. These noise pulses further cause an erroneous operation of the tacking/focusing servos.

In order to avoid this erroneous operation there have been proposed methods where the tracking/focusing error signal is masked, i.e. disabled, during a period when the tracking/focusing error signal is higher than a predetermined threshold level (such as disclosed in Japanese Laid-open Provisional Patent Publication Hei1-263947) or during a predetermined period at transitions of the light levels (such as disclosed in U.S. Pat. No. 4,807,206 and Japanese Laid-open Provisional Patent Publication Hei2-66743). The predetermined period is determined by hardware such as a shift resistor or a monostable multivibrator.

The prior art methods experience problems in that the required period varies depending on the amplitude of the light modulation or the circuit condition, however, the period to be predetermined cannot be easily modified because the period is determined by the hardware. Furthermore, in tuning up the optical disk apparatus it is desirable that the period is easily adjustable.

SUMMARY OF THE INVENTION

It is a general object of the invention to provide a servo tracking circuit that allows an easy preset of duration of a masking pulse to momentarily disable a tracking servo signal during a transient of switching write/erase pulse applied to light source so as to prevent an erroneous operation of the servo signal caused from the switching transient of the writing/erasing pulse.

An optically writable/readable/erasable disk apparatus according to the present invention comprises: a pulse edge detector for outputting a pulse detection signal upon detecting an edge of a writing pulse to modulate said light so as to record the datum onto the disk or an erasing pulse to modulate said light so as to erase the recorded data; a masking pulse forming circuit for generating in response to the pulse detection signal a masking pulse to disable the servo signal during the masking pulse; and a pulse duration setting circuit including a counter which counts clock pulses so as to determine a pulse duration of said masking pulse, where a count number of the counter is presetable.

The above-mentioned features and advantages of the present invention, together with other objects and advantages, which will become apparent, will be more fully described hereinafter, with references being made to the accompanying drawings which form a part hereof, wherein like numerals refer to like parts throughout.

A BRIEF DESCRIPTION OF DRAWINGS

FIG. 1 schematically illustrates an optical disk apparatus where the present invention can be embodied;

FIG. 2 schematically illustrates the first preferred embodiment of the present invention;

Figure 5:
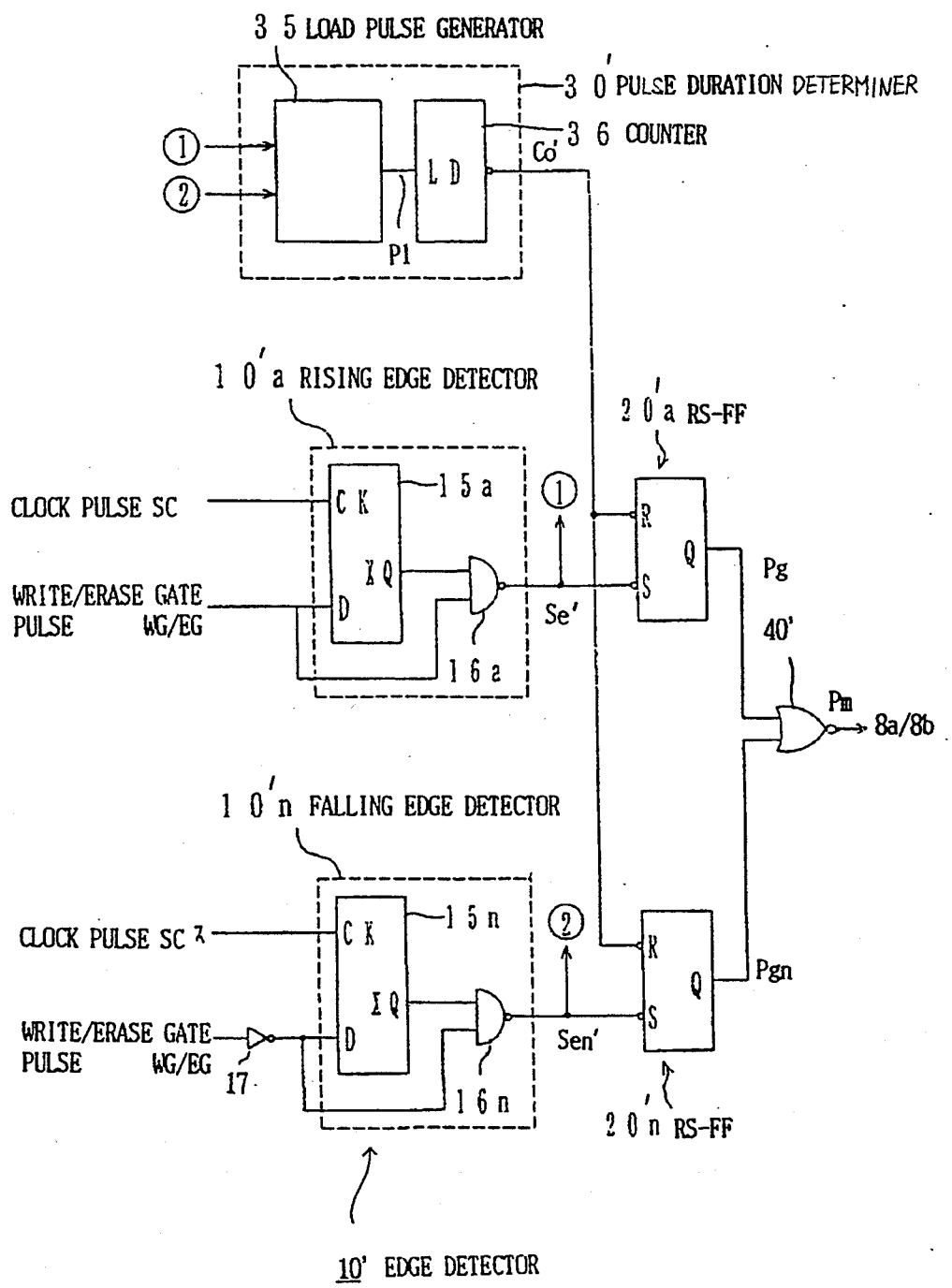
Figure 6:
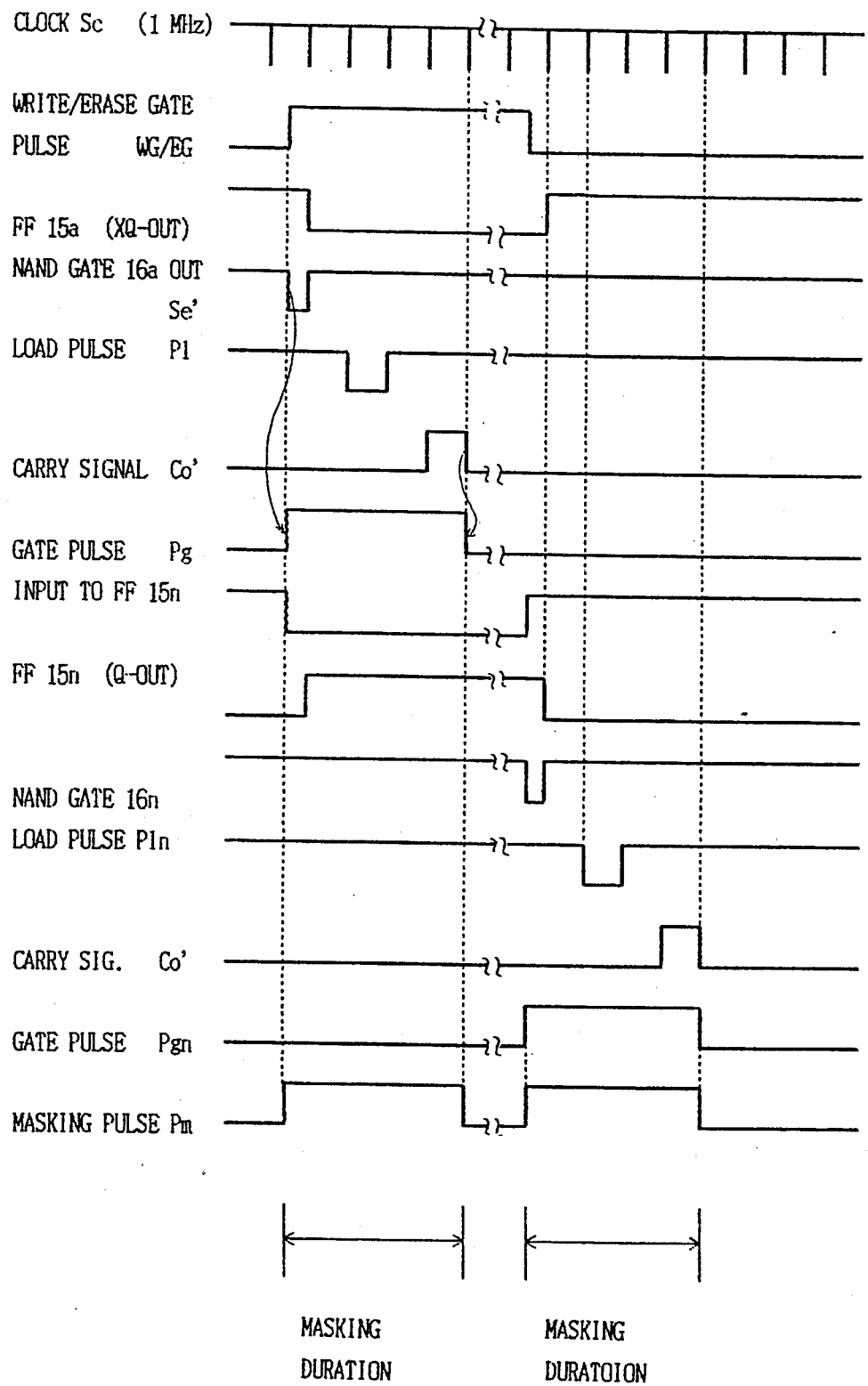

FIG. 5 schematically illustrates the second preferred embodiment of the present invention; and FIG. 6 is a timing chart of the FIG. 5 circuit.

DESCRIPTION OF THE PREFERRED EMBODIMENT

Figure 1:
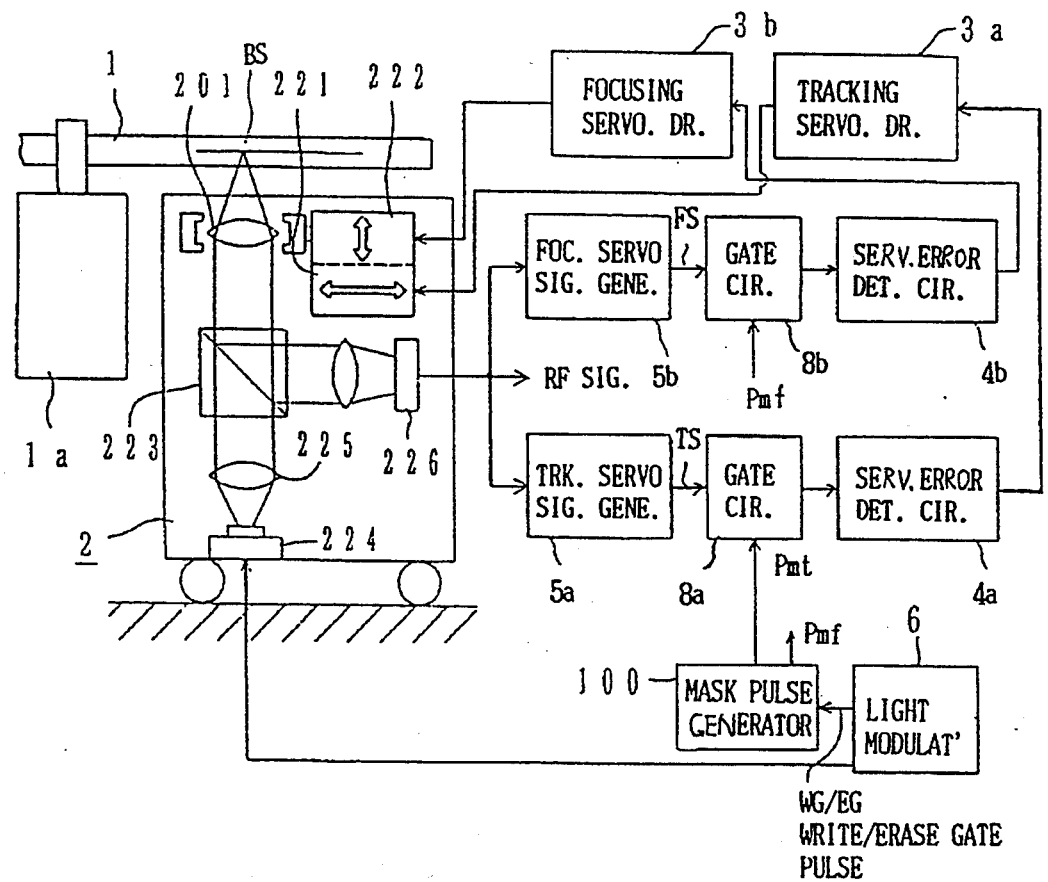

An optical disk apparatus where the present invention is embodied is schematically illustrated in FIG. 1. An optical disk 1 provided with coaxial or spiral track(s) by as fine as several micro meter radial spacing is rotated by a motor 1a. An optical head 2 is moved in radial direction of disk 1 by a voice coil motor (not shown in the figure). In optical head 2 a light beam emitted from a light source 224, i.e. typically a laser diode, is led by a lens 225 and a polarization beam splitter 223 to an object lens 201 so as to be focused as a beam spot BS onto one of the tracks on optical disk 1. A light reflected from optical disk 1 is reversely input to polarization beam splitter 223 so as to be input to a light detector 226, typically formed of four quarterly arranged photo sensors.

In order for the beam spot to accurately trace focus onto the track there are provided a tracking actuator 221 for radially moving object lens 201 and a focusing actuator 222 for axially moving object lens 201.

Light signals output from light detector 226 are processed by a tracking error signal generator 5a and a focusing error signal generator 5b, to output a tracking error signal TS and a focusing error signal FS, respectively, according to a well-known technique. Moreover, a sum of four sensor's outputs is a RF signal to present the data on the track.

Tracking error signal TS and focusing error signal FS are negatively fed back via tracking servo driver 3a and focusing servo driver 3b, gate circuits 8a and 8b and servo error detection circuits 4a and 4b, to tracking actuator 221 and focusing actuator 222, respectively, so that the tracking error signal and the focusing error signal be kept minimum (that is, so that the light spot automatically traces the track). Servo error detection circuits 4 compares the signal input thereto with a predetermined threshold level so as to output an alarm signal to prevent an erroneous operation of the tracking circuits when the input signal is larger than the threshold level. Gate circuits 8 will be explained later in detail.

A light modulator 6 controls the light level emitted from light source 224, that is, outputs a write pulse, an erase pulse or a continuous signal for the light to write, erase and read the data, respectively.

The above-explained apparatus configuration is widely known.

Figure 2:
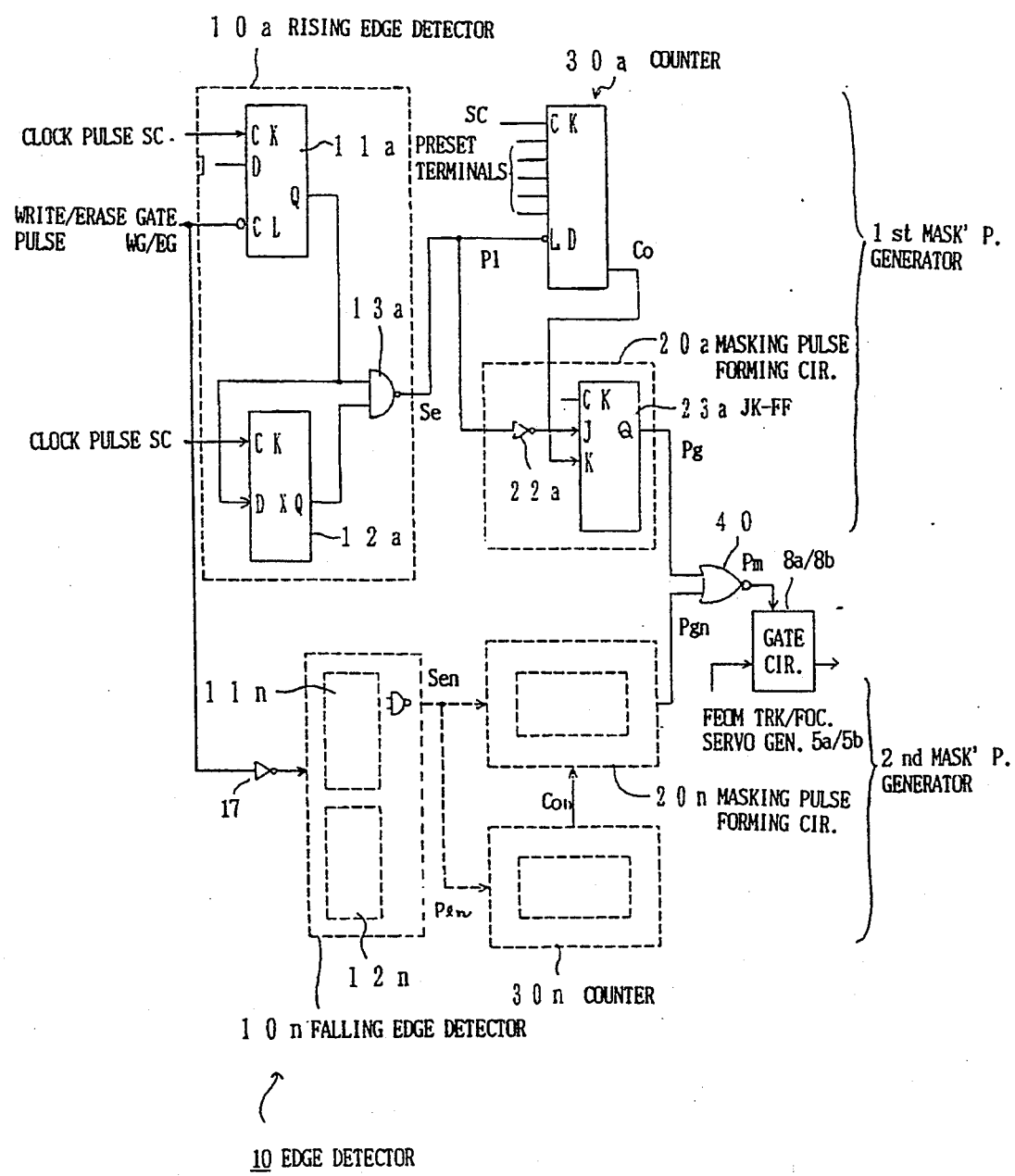
Figure 3:
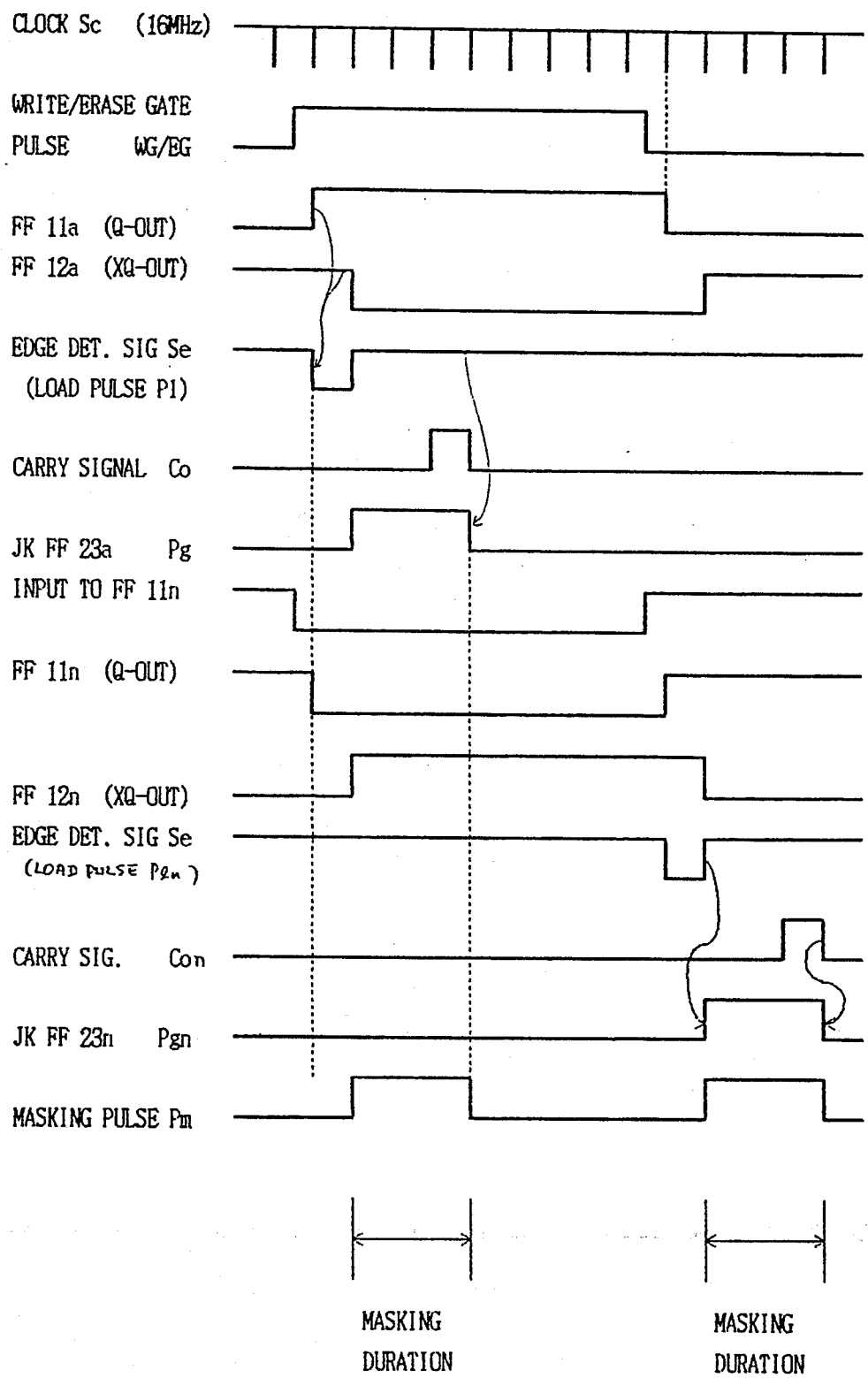
FIG. 3 is a timing chart of the FIG. 2 circuit.

Referring to FIGS. 2 and 3, a first preferred embodiment of masking pulse generators 100 according to the present invention is hereinafter described in detail. Masking pulse generators 100 and gate circuit 8a and 8b of FIG. 1 are shown in FIG. 2 in detail in FIG. 2 a first masking pulse generator having suffix "a" in the notation numerals is on the upper half of FIG. 2 and is for detecting the rising edge of the write pulse/erase pulse and a second masking pulse generator having suffix "n" in the notation numerals is on the lower half of FIG. 2 and is for detecting a falling edge of the write/erase pulse. The two masking pulse generators are identical except the input signal to falling edge detector 10n is reversed by an inverter 17; therefore, detailed circuits in the blocks of the second masking pulse generator is omitted.

Rising edge detector 10a includes a first flip-flop 11a of a delay type, a second flip-flop 12a of a delay type and a NAND gate 13a. A data-input terminal D of first flip-flop 11a is pulled up to a power source voltage so as to be kept at logical level H. A write gate pulse WG and an erase gate pulse EG, each for controlling the write pulse and the erase pulse, are input from light modulator 6 inversely to a clear terminal CL of first flip-flop 11a. Clock terminals CK of the flip-flops are input with clock pulses Sc.

When logical level of the write gate pulse WG or the erase gate pulse EG, each determining the writing/erasing pulses, turns to H, a Q-output of first flip-flop 11a turns to H on the next clock pulse. The Q-output is input to data-input terminal D of second flip-flop 12a and to a first input terminal of NAND gate 13a. On the further next clock pulse the XQ output of second flip-flop 12a turns to logical level L, which is input to a second input terminal of NAND gate 13a. Accordingly, NAND gate 13a outputs between the transitions of the two flip-flops a negative pulse Se, which indicates the rising edge of the write/erase gate pulse WG/EG. This edge detection signal Se is input as a load pulse P1 to a load terminal LD of a counter 30a and via an inverter 22a to a J-input terminal of a third flip-flop 23a of J-K type. A rising edge of the load pulse P1 initiates counter 30a to count the number of clock pulses input to its clock terminal CK. The number to be counted is preset via preset terminals of counter 30a by a program of a computer which is not shown in the figure. Upon counting up the preset number, counter 30a outputs frown its carry terminal a carry signal Co having H level and having a duration of a single clock cycle. Carry signal Co is input to a K-input terminal of third flip-flop 23a. Q-output of third flip-flop 23a has been at H level on and after the rising edge of load pulse P1, and now turns to L level by carry signal Co. Thus, third flip-flop 23a and inverter 22a form a masking pulse forming circuit 20a. The Q-output, i.e. a gate pulse Pg, of third flip-flop 23a controls as a masking pulse Pm via an OR gate 40 the gate circuits 8a and 8b, each typically formed of an analog switch. Inputs to gate circuits 8a and 8b are the tracking error signal TE and the focusing error signal FE, respectively, from tracking error signal generator 5a and focusing error signal generator 5b. Thus, the tracking error signal TE and the focusing error signal FE, each to be input to servo error detection circuits 4a and 4b, are masked, i.e. killed, during the duration of masking pulse Pm. Therefore, in servo detection circuits 4a and 4b the signals passing therein do not exceed the threshold level, that is, no alarm signal due to the undesirably large transient signal is generated therefrom so that the servo operation can be kept on without being disturbed by the erroneously generated alarm signal. The duration of the masking pulse Pm can be modified by changing the preset number of counter 30a.

Figure 4:
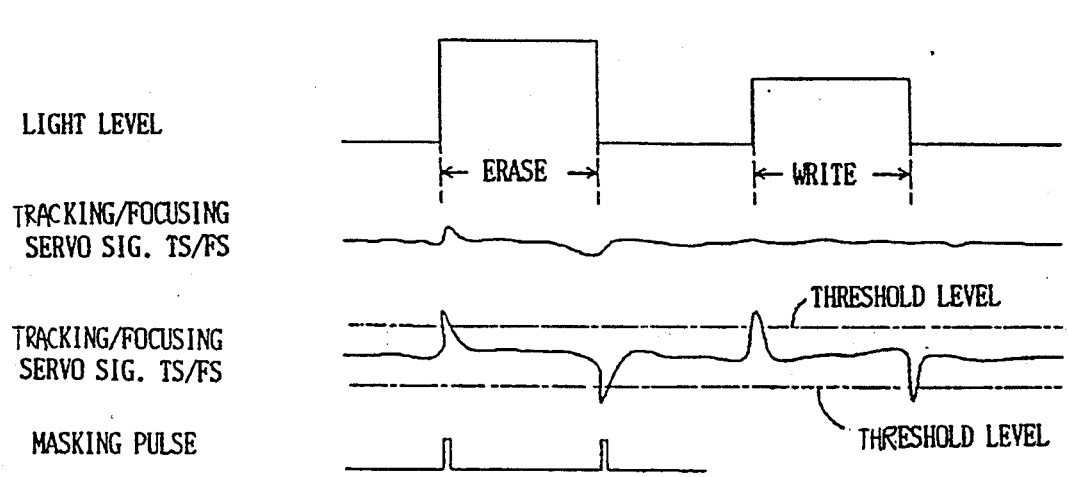
FIG. 4 shows waveforms generated in FIG. 1 circuits.

Relations between the waveforms of the signals described above are also shown in FIG. 4.

In FIG. 1 the masking pulses are independently denoted with Pmf and Pmt for focusing servo circuit and tracking servo circuit, respectively, though the explanation was made with a single masking pulse Pm. These two masking pulses Pmf and Pmt may be common for both the focusing and tracking servo circuits depending on the design requirement.

Circuit operation of the first masking pulse generator at the falling edge of the write/erase gate pulse is hereinafter described.

When the logical level of the write/erase gate pulse WG/EG turns from H to L, Q-output of first flip-flop 11a turns to L on the next clock pulse. On the further next clock pulse the XQ output of second flip-flop 12a turns to logical level H, which is input to NAND gate 13a. Accordingly, NAND gate 13a keeps outputting H level. In other words, nothing takes place to initiate third flip-flop 20a or counter 30a at the falling transition of the write/erase gate pulse in the first masking pulse generator.

However, the second masking pulse generator performs the same things as first masking pulse generator at the rising transition of the write/erase gate pulse, because the input signal thereto is inverted by inverter 17.

As shown in the lower half of FIG. 3, when the logical level of the write/erase gate pulse turns from H to L, that is, when the input to falling edge detector 10n turns to H, Q-output of fourth flip-flop 11n, which corresponds to first flip-flop 11a, turns to H on the next clock pulse. On the further next clock pulse the XQ output of fifth flip-flop 12n, which corresponds to second flip-flop 12a, turns to logical level L. Accordingly, a negative edge detection signal Sen is generated between the transitions of the fourth and the fifth flip-flops. The rising edge of edge detection signal Sen initiates as a load pulse P1 of a second counter 30n, which corresponds to first counter 30a, to count clock pulses input thereto. Upon counting up a number preset therein, second counter 11n outputs a second carry signal Con. A second gate pulse Pgn is thus formed between the trailing edges of load pulse P1 and second carry signal Con. Second gate pulse Pgn outputs via NOR gates 40 a second masking pulse Pmn so as to control gate circuit 8a and 8b. Thus, duration of the second masking pulse can be determined independently from that of the first masking pulse by the computer.

The undesirably large transient in the tracking/focusing error signals reach the threshold level of servo error detection circuits 4 at one to ten micro seconds after the rising edge of the write/erase gate pulse. The duration necessary to mask the undesirably larger signal than the threshold level is typically 50 to 100 $\mu$s. In the above-described first preferred embodiment circuit the clock pulse is preferably chosen to be of 10 MHz or higher. Accordingly, the about two clock-pulse delay of the masking pulse after the write/erase pulse application is quite negligible. The number to be preset to counters 11a and 11n is chosen 1024, for example. Referring to FIGS. 5 and 6, a second preferred embodiment of masking pulse generators 100 according to the present invention is hereinafter described, where a lower frequency clock pulse, such as 1 MHz, is employed. In FIG. 5 a load pulse generator 35 includes the same circuits as rising edge detector 10a of FIG. 2. When the logical level of the write/erase gate pulse WG/EG turns to H, which is input to an input terminal D of a flip-flop 15 of D-type as well as a NAND gate 16a, XQ output of flip-flop 15a turns to L on the next clock pulse. Accordingly, output of NAND gate 16a turns to L at the rising edge of the write/erase pulse and returns to H at the transition of flip-flop 15a so as to form an edge detection signal Se'. On the further next clock pulse the H level of the input to load pulse generator 35 generates a negative pulse having a single clock cycle duration, that is a load pulse P1. The rising edge of load pulse P1 initiates counter 36 to count clock pulses input thereto. Upon counting up a number preset to counter 36, the counter outputs a carry signal Co'. Carry signal Co' resets a R-S flip-flop 20a' of negative logic which has been set by the falling edge of the edge detection signal Se' output from NAND gate 16a. Thus, load pulse generator 35 and counter 36 act as a pulse duratin determiner 30' which corresponds to counter 30 of FIG. 3. Q-output of R-S flip-flop 20a' forms a gate pulse Pg, which is then input via a NOR gate 40' to gate circuits 8a and 8b as a masking pulse Pm. Another flip-flop 15n, NAND gate 16n and flip-flop 20n' perform the same thing as flip-flop 15a, NAND gate 16a and flip-flop 20a', except flip-flop 15n receives the write/erase gate pulse inverted by an inverter 17, so that a falling edge of the write/erase gate pulse is detected. Output of NAND gate 16n is processed by load pulse generator 35. Though in the second preferred embodiment a single load pulse generator 35 is provided commonly to rising edge detector 10'a and falling edge detector 10'n, two of load pulse generator 35 may be provided independently to each of the rising edge detector and the falling edge detector so that different count numbers can be respectively preset.

Advantage of the second preferred embodiment circuit configuration is in that the masking pulse starts concurrently with the application of the write/erase gate pulse while in the first preferred embodiment circuit it takes some clock cycles for the masking pulse to start. Therefore, the second embodiment circuit is advantageous in employing clock pulse of lower frequency, such as 1 MHz, while the circuit configuration is somewhat more complex than that of the first preferred embodiment.

Though in the first preferred embodiment counters 30a and 30n are provided independently for rising edge detector 10a and falling edge detector 10n, these two counters may be a single counter acting commonly to the rising edge detector 10a and the falling edge detector 10n so that same count number can be employed therein.

Advantageous effect of the present invention is in that the preset number in the counter that directly relates to the duration of the masking pulse can be arbitrarily and easily preset by modification of the program of the computer depending on the transient Waveforms of the tracking/focusing error signals resulted from the conditions of the laser diode and/or the related circuit configuration, etc.

Though it is described that the number to be counted is preset by a program of computer, it is apparent that the counter may also be preset as well by modifying external connections to the preset terminals of the counter. Gate circuits 8a and 8b referred to as analog switch in the above description may be formed of widely employed appropriate switch to allow to gate the signal input thereto. Moreover, if the tracking-/focusing error signals are digital, the gate circuit 8 may be formed of an AND gate.

The many features and advantages of the invention are apparent from the detailed specification and thus, it is intended by the claims to cover all such features and advantages of the methods which fall within the true spirit and scope of the invention. Further, since numerous modifications and changes will readily occur to those skilled in the art, it is not detailed to limit the invention and accordingly, all suitable modifications are equivalents may be resorted to, falling within the scope of the invention.

What I claim is :

1. An optical disk apparatus, including a servo signal generator for generating a servo signal indicating a degree of accuracy of tracing a track, the optical disk apparatus being servo-controlled to trace the track according to the servo signal, the track being optically and selectively writable, readable and erasable according, respectively, to write, read and erase pulses of light emitted into the track and having respectively different levels and durations of light, the optical disk apparatus comprising:

pulse edge detection means for outputting an edge detection signal upon detecting an edge of a writing pulse or an edge of an erasing pulse;

masking pulse forming means for generating, in response to said edge detection signal, a masking pulse used for disabling the servo signal during said masking pulse so as to prevent an erroneous servo signal caused from a switching transient of said writing pulse or said erasing pulse; and pulse duration setting means, receiving clock pulses as an input, for setting a pulse duration of said masking pulse by counting the clock pulses, comprising a counter to count the clock pulses, a count number of said counter being presettable.

2. An optical disk apparatus as recited in claim 1, wherein said counter is controlled by a computer so that said count number is preset by the computer.

3. An optical disk apparatus as recited in claim 1, wherein said count number is preset by external connections of preset terminals of said counter.

4. An optical disk apparatus as recited in claim 1, wherein:

said pulse edge detection means comprises a rising edge detector and a falling edge detector for detecting a respective rising edge and falling edge of said writing pulse or said erasing pulse; and said masking pulse forming means comprises a first masking pulse forming circuit and a second masking pulse forming circuit, output of said rising edge detector being coupled to said first masking pulse forming circuit and output of said falling edge detector being coupled to said second masking pulse forming circuit.

5. An optical disk apparatus as recited in claim 4, wherein said pulse duration setting means is common to both of said first masking pulse forming circuit and said second masking pulse forming circuit.

6. An optical disk apparatus as recited in claim 4, wherein said pulse duration setting means comprises a first pulse duration setting unit and a second pulse duration setting unit, having individual pulse durations, said first pulse duration unit being coupled to said rising edge detector and said second pulse duration setting unit being coupled to said falling edge detector.

7. An optical disk apparatus as recited in claim 1, wherein
   said pulse edge detection means outputs a pulse detection signal in synchronization with the clock pulses; and
   said masking pulse forming means comprises a flip-flop which operates in synchronization with the clock pulses.

8. An optical disk apparatus as recited in claim 1, wherein
   said pulse edge detection means outputs a pulse detection signal synchronously with the clock pulses; and
   said masking pulse forming means comprises a flip-flop which operates synchronously with the clock pulses.

9. An optical disk apparatus, including a servo signal generator for generating a servo signal indicating a degree of accuracy of tracing a track, the optical disk apparatus being servo-controlled to trace the track according to the servo signal, the track being optically and selectively writable, readable and erasable according, respectively, to write, read and erase pulses of light emitted into the track and having respectively different levels and durations of light, the optical disk apparatus comprising:
   pulse edge detection means for outputting an edge detection signal upon detecting an edge of a writing pulse or an edge of an erasing pulse;
   masking pulse forming means for generating, in response to said edge detection signal, a masking pulse used for disabling the servo signal during said masking pulse so as to prevent an erroneous servo signal caused from a switching transient of said writing pulse or said erasing pulse;
   pulse duration setting means, receiving clock pulses as an input, for setting a pulse duration of said masking pulse by counting the clock pulses, said pulse duration setting means comprising a counter to count the clock pulses, a count number of said counter being presettable; and
   counter presetting means, connected to said counter and comprising a computer and computer software which runs on said computer, for presetting said count number via said computer software.

* * * * *

UNITED STATES PATENT AND TRADEMARK OFFICE
CERTIFICATE OF CORRECTION

PATENT NO. : 5,410,528
DATED : April 25, 1995
INVENTOR(S) : Satoshi FURUTA et al.

It is certified that error appears in the above-indentified patent and that said Letters Patent is hereby corrected as shown below:

Col. 1, line 7, delete "1.";
    Line 10, delete "2.";
    Line 26, delete ", therefore" and insert therefor
        --. Therefore--.

Col. 2, line 45, after "trace", insert --and--;
    Line 46, after "track", insert a comma (",").

Col. 3, line 53, delete "frown" and insert therefor --from--.

Col. 5, line 2, after "example", insert a hard return to create a
        new paragraph beginning with "Referring";
    Line 8, after "2.", insert a hard return to create a
        new paragraph beginning with "When";
    Line 30, after "Pm.", insert a hard return to create a
        new paragraph beginning with "Another";
    Line 37, after "35.", insert a hard return to create a
        new paragraph beginning with "Though";
    Line 65, delete "Waveforms" and insert therefor
        --waveforms--.

UNITED STATES PATENT AND TRADEMARK OFFICE
CERTIFICATE OF CORRECTION

PATENT NO. : 5,410,528
DATED : April 25, 1995
INVENTOR(S) : Satoshi Furuta, et. al.

It is certified that error appears in the above-indentified patent and that said Letters Patent is hereby corrected as shown below:

Col. 6, line 5, after "counter", insert a hard return to create a new paragraph beginning with "Gate".

Signed and Sealed this

First Day of August, 1995

Attest:

BRUCE LEHMAN

Attesting Officer

Commissioner of Patents and Trademarks